United States Patent

Winnacker et al.

[11] 4,153,357
[45] May 8, 1979

[54] UNDERWATER CAMERA

[75] Inventors: Helmut Winnacker, Burgdorf; Jurgen Dierssen, Barsinghausen, both of Fed. Rep. of Germany

[73] Assignee: Preussag Aktiengesellschaft, Fed. Rep. of Germany

[21] Appl. No.: 835,436

[22] Filed: Sep. 22, 1977

[30] Foreign Application Priority Data

Nov. 4, 1976 [DE] Fed. Rep. of Germany ....... 2650524

[51] Int. Cl.² .......................... G03B 17/08; G01S 9/66
[52] U.S. Cl. ...................................... 354/64; 340/3 R; 181/124
[58] Field of Search ................. 354/64, 65, 67, 73, 354/162, 163, 266, 267, 66; 340/1 R, 3 R; 200/61.01; 181/124

[56] References Cited

U.S. PATENT DOCUMENTS

| 3,143,049 | 8/1964 | Tholey | 354/66 |
| 3,261,274 | 7/1966 | Smith | 354/64 |
| 3,522,764 | 8/1970 | Biber et al. | 354/195 |
| 3,738,248 | 6/1973 | Fish et al. | 354/64 |
| 3,750,547 | 8/1973 | Walthier et al. | 354/64 |
| 3,899,790 | 8/1975 | Pocachard | 354/64 |
| 4,035,816 | 7/1977 | Winnacker | 354/64 |

Primary Examiner—L. T. Hix
Assistant Examiner—William B. Perkey
Attorney, Agent, or Firm—Allegretti, Newitt, Witcoff & McAndrews

[57] ABSTRACT

An underwater camera in a pressure tight housing and a release mechanism for releasing the shutter at a predetermined distance from the sea bed. The release mechanism includes a transducer on the housing exterior for transmitting ultrasonic signals and receiving echo signals and an electronic circuit on the interior of the housing for opening the shutter in response to the echo signals when the camera has reached the predetermined distance from the sea bed.

10 Claims, 2 Drawing Figures

UNDERWATER CAMERA

BACKGROUND AND SUMMARY OF THE INVENTION

The present invention relates to an underwater camera, comprising a pressure-tight housing in which is disposed a camera and a release mechanism which responds as the underwater camera reaches a predetermined distance from the bed of the sea to release the shutter of the camera.

In U.S. Pat. No. 3,261,274 an underwater camera is disclosed which is fixed on a grab for taking samples of the sea bed and is designed to photograph the sea bed from which the sample is taken and before the sampling operation. The release mechanism consists of a heavy ball, which is connected by a relatively long cord to a switch, which is arranged externally of the pressure-tight housing of the camera and is held in the open position by the weight of the depending ball. When the grab is lowered, the ball strikes the sea bed with the spacing which is determined by the length of the cord and, as a result, the cord is relieved of any load and the electric switch is closed and the camera released.

A serious disadvantage of such a release mechanism consists in that the ball coming into contact with the sea bed stirs up the surface of the latter to some amount, depending on the nature of the said bed and, thus, destroys it. Simultaneously, the picture which is taken is blurred. In addition, the instant of release cannot be exactly defined, because, for example, with a soft sea bed such as mud, the ball penetrates for a relatively long distance into the bed before the cord is relieved of weight to such extent that the release operation occurs. Consequently, the distance from which the photographic exposure is made no longer coincides with the range setting of the objective, so that blurred pictures are produced. It is not possible to make allowances beforehand for the penetration of the ball into the sea bed, since the depth of penetration is not known in advance. In addition, time delays are produced by the guiding of the cord, which can also be adversely affected by soiling material, such as sand or mud. These delays are not of a fixed value, so that a further danger of a release taking place at an incorrect distance results.

The constructional design of the release mechanism is comparatively complicated and, in addition, the manipulation thereof is difficult. The long cord with the weight, which can easily begin oscillatory movements, can become entanged on board a ship and even lead to faulty exposures. Moreover, the weight can adversely affect the closing of the grab on the sea bed, since it is practically impossibe to hold the weight free from the grab.

A quite important disadvantage of this known release mechanism is in the high weight of the ball used for release purposes. This weight has to be so large that it prevents faulty release actions due to the resistance to flow of the ball in the water as it is sinking and, in addition, that it reliably overcomes the frictional forces in the transmission of the traction by the cord and in the releasing switch. With a free-falling grab, which is provided with a buoyancy element and additional weights, which are discarded on the sea bed, the dead weight is thereby considerably increased, so that correspondingly the useful load is reduced. This also applies to a camera which is not simultaneously connected to a grab, but is used with a freely falling arrangement.

A free-falling arrangement for taking sea bed samples is disclosed in German Auslegeschrift 1,911,782. That arrangement comprises glass balls as buoyancy members, in the uppermost of which is disposed a camera. The releasing of the camera is effected through a cord, which is tightened on one half of the grab and is broken when the grab is closed. As a result thereof a magnet arranged externally of the ball or sphere with the camera in it is moved into the range of magnetically actuated contacts, which are thereby closed and operate the camera shutter electromagnetically.

With this known release mechanism, which became known some years after the arrangement already previously discussed, the disadvantage of the dead weight of a release ball or sphere is avoided, but more serious disadvantages are caused as a result thereof. Releasing of the camera is, in fact, only possible when the grab has come into contact with the sea bottom and commences closing. As the grab approaches the sea bed, however, the surface thereof is stirred up considerably and destroyed by the water flow, which is caused by the descending grab. Moreover, the release always only occurs when the halves of the grab have become operative, as a result of which the surface of the sea bed is also destroyed. Therefore, it is not possible to take unimpaired pictures of the area of the sea bed from which the sample is taken. It is also impossible to avoid this disadvantage by the camera being directed towards an area closely adjacent the grab, as is the case with this known arrangement; for in this case also, stirring effects are also produced at this position by the impacting grab and, in addition, it is not that part of the sea bed from which the sample is taken which is photographed. And, with an obliquely directed camera, it is not possible to produce a sharp definition in all regions of the picture, since the spacing of the exposed parts from the camera is highly variable. Finally, it is also a disadvantage that, when the sea bed is soft and muddy, it is not possible to establish exactly the point of release, since the point of release depends on the amount to which the grab sinks into the mud. It is, thus, impossible to make sharp exposures of the sea bed.

The present invention has for some of its objects to provide a release mechanism for an underwater camera, which is of least possible weight, permits exact release operations, even when the sea bed is soft, is simple to manipulate and, when using a grab especially of the free-fall type, permits accurate exposure of that part of the sea bed from which the sample of the bed is to be taken.

The objects forming the basis of the invention are achieved by the fact that the release mechanism is a measuring means arranged in the pressure-tight housing and operating by ultrasonics, the said means being connected through pressure-tight, electric bushings in the housing with an electro-acoustic transducer arranged externally of the housing and serving for the transmission and the reception of the ultrasonic signals.

The solution according to the present invention avoids any movable parts outside the camera housing. In this way, all the disadvantages which arise with the known arrangements because of parts lying outside the camera housing are avoided. A ball or sphere suspended from a cord or cable for scanning the sea bed is avoided, so that a considerably lower weight is produced and there is no destruction of the sea bed which is to be photographed. The manipulation and construction are also considerably simplified. Since an ultrasonic signal, even with a soft sea bed, responds accurately to the surface of the bed, it is always possible to make accurate and sharp pictures, because the distance for the release can be accurately predetermined. This also leads to the advantage that, when the distance or spacing is accurately known, the size and position of the objects which are photographed can be exactly determined. Because the ball or sphere is not used, the weight is additionally also considerably reduced, so that in those cases where a free-fall arrangement is used, the buoyancy can be lower or the useful load can be larger. This advantage is considerable when the camera involved is an underwater camera which is to be used at great depths, of for example 8000 meters.

The electro-acoustic transducer of the present invention is preferably arranged in an externally disposed recess of the housing, so that it is actually in communication with the surroundings as regards the sound, but lies in a position completely protected mechanically. In an underwater camera for great depths, the formation of a recess in the housing may present strength problems. It is, therefore, desirable for the recess for the electro-acoustic transducer to be arranged in a cover for closing the housing and for this recess to be in the form of a radial bore in a circular cover.

A further feature of the invention includes the range-measuring mechanism which, operating by ultrasonics, generates periodically recurring pulses, which respectively actuate a switch for transmitting the ultrasonic signals and simultaneously triggers a timing member which, when its impressed or imprinted time has expired, actuates a switch which then interrupts the channel for the reflected echo signal from the electro-acoustic transducer to means for operating the release member for the shutter of the camera. By using this procedure, the result is obtained in a simple manner that the echo signal can be directly used for the release, since it is only then that it is able to pass through its transmission channel in the arrangement and cause the release, if it appears before the channel is interrupted.

A further feature of this constructional form consists in that the pulses simultaneously trigger a further timing member, of which the imprinted time is somewhat shorter than that of the first timing member and that, after its impressed time has elapsed, actuates a switch which opens the channel for the reflected echo signal. By this procedure, the transmission channel for the echo is substantially only open for the time within which the echo signal must arrive, when it has scanned the sea bed in the pre-set range. In practice, therefore, a timing window or apertured is formed, through which the echo signal has to pass in order to become effective. Echo signals which, in time, lie before or behind the aperture, cannot become effective. In this way, the danger of faulty exposures is minimized.

For the displacement of the window or aperture as a function of time, it is desirable for the timing members to be adjustable, and it is at the same time desirable that the timing members are adjustable in the same direction by a common actuating means in such a way that the opening time of the channel for the echo signal, as established by the difference of the imprinted times of the two timing members, remains substantially constant with adjustment of the times. It is therefore possible by means of the common actuating means to adjust the response range or distance without any difficulties.

In a further feature of the invention, the reflected echo signal actuates an electromagnet for opening the shutter of the camera and, simultaneously, starts or triggers a timing member which, after expiration of the imprinted time which corresponds to the necessary time for the opening of the camera shutter, actuates an electromagnet for closing the shutter. The opening of the shutter can, thus, be easily effected in this way, and the time of opening naturally being capable of being basically adjustable.

Finally, a further feature of the invention is that the timing member triggered by the echo signal is adjustable together with the timing members for the interruption and opening of the channel for the echo signal, in such a way that, with increasing response range, the imprinted time of the timing member for closing the diaphragm is increased and, thus, the exposure time is lengthened. The result achieved by this feature is that the opening time is dependent on the response range, so that the exposure time is adapted to the picture brightness which is to be expected.

These and other objects, features and advantages of the present invention will be more clearly understood through a consideration of the following detailed description.

BRIEF DESCRIPTION OF THE DRAWINGS

In the course of this description, reference will frequently be made to the attached drawings in which.

DESCRIPTION OF THE PREFERRED EMBODIMENT

Figure 1:
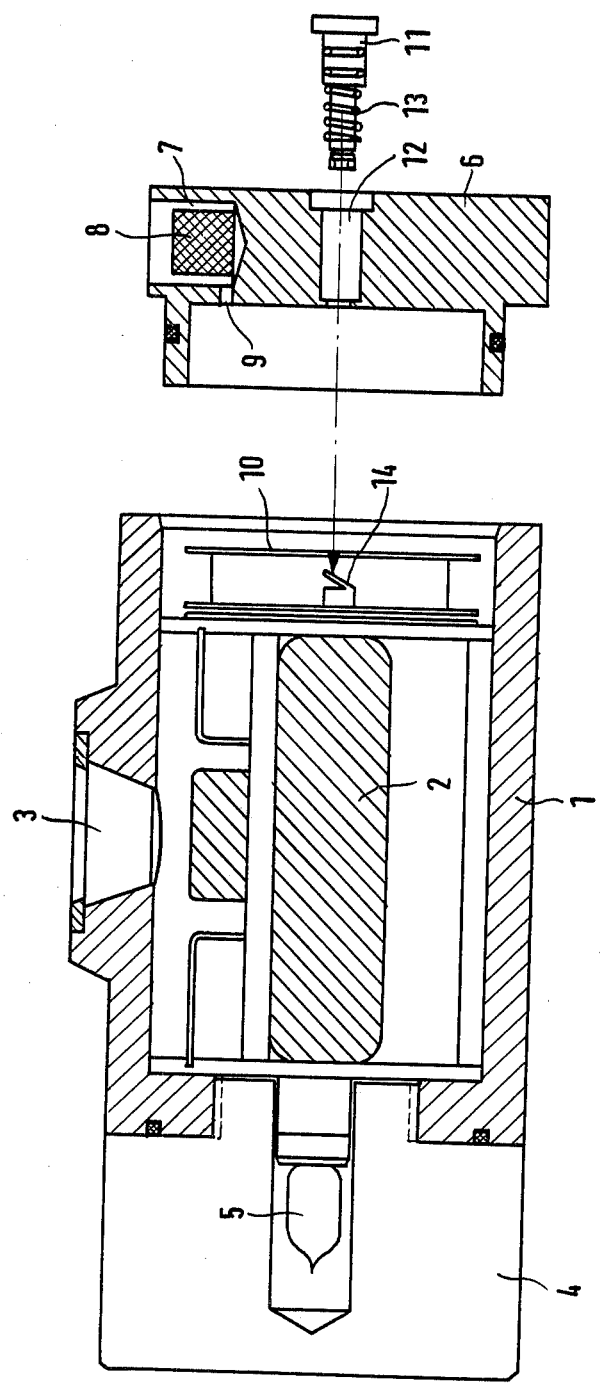
FIG. 1 is a partially exploded section through an underwater camera constructed in accordance with the principles of the present invention.

In FIG. 1 an underwater camera is shown in section and opened. Arranged in a housing 1 is a photographic camera 2, in front of which an optical window 3 is provided in the housing 1. The housing 1 is closed on one of its sides by a light-permeable cap 4, in which is arranged a flash bulb 5, which is triggered or released together with the camera 2.

On the other side, the housing 1 is closed by a cover 6, in which is provided a radial bore 7 in which is located an electro-acoustic transducer 8, which is connected, through electric bushings 9, to an electronic part or section 10 of the release mechanism. The electro-acoustic transducer 8 points in the same direction as the photographic camera 2 through the window 3, so that it is possible for objects and, more particularly, the sea bed to be scanned, the said objects or bed being disposed at a certain distance in front of the camera 2.

A sealed piston 11 is also mounted to be displaceable in a bore 12 in the cover 6. The piston is moved inwardly against the force of a spring 13 as the water pressure increases and, eventually, actuates a switch 14, with which the complete release mechanism is enabled or made operative. By selecting or adjusting the force of the spring 13, it is thus possible to pre-establish the depth at which the release mechanism may be activated.

Figure 2:
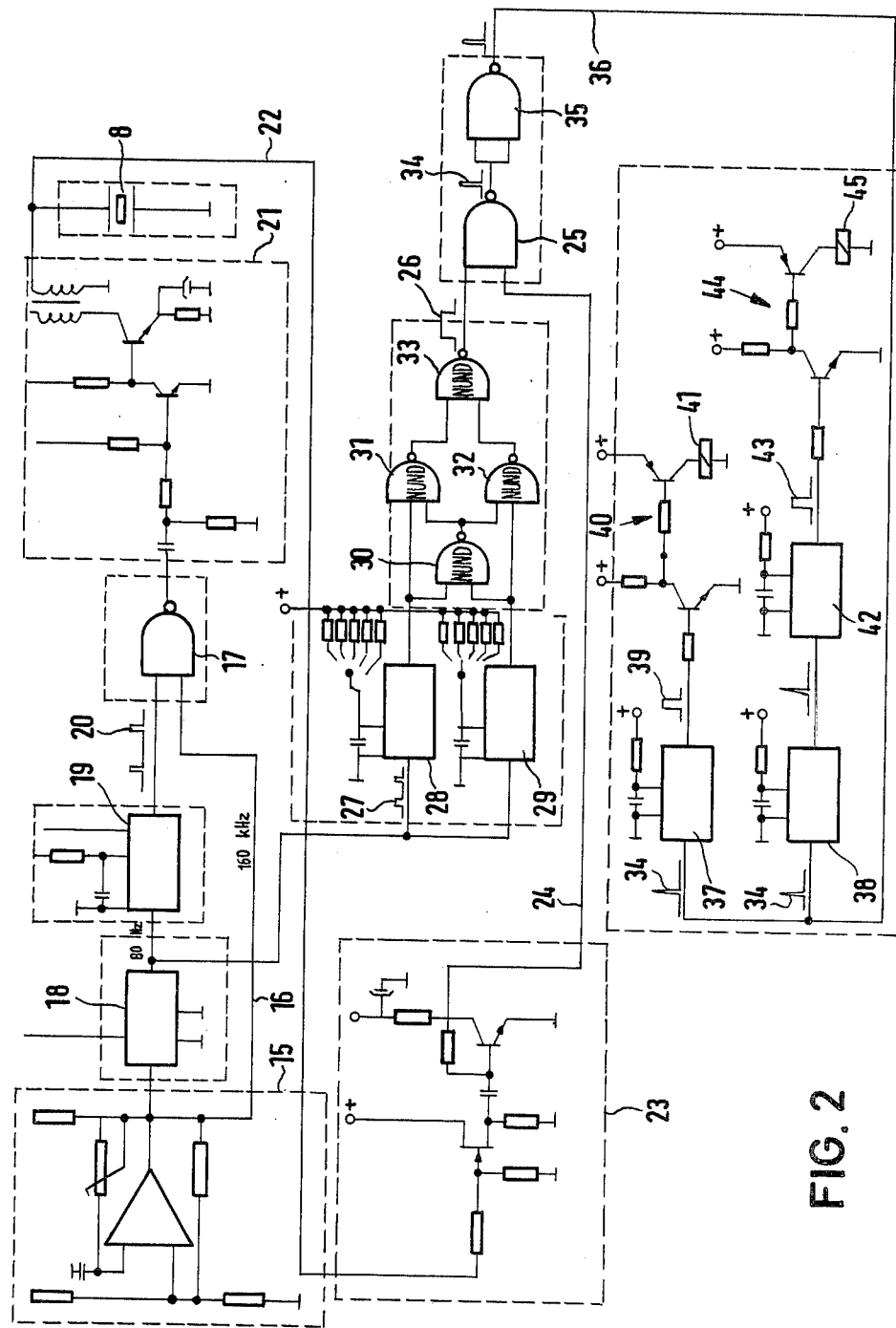
FIG. 2 is a block circuit diagram of a preferred electronic circuit of the release mechanism.

In FIG. 2 a preferred embodiment of release mechanism is shown which is essentially represented in block circuit diagram form. The release mechanism comprises an oscillator 15 for producing the ultrasonic signals, which pass through line 16 to a switch 17. These signals also pass to a frequency divider 18, which derives from the ultrasonic frequency of 160 kHz, a switching frequency of 80 Hz which are converted in a pulse former 19 into pulses 20, which serve for switching the ultrasonic frequency through the switch 17. Thus, brief ultrasonic pulses are established at the outut of the switch 17, the length of such pulses being determined by the pulses 20. These scanning signals are amplified in an amplifier 21 and irradiated from the electro-acoustic transducer 8, which is preferably a piezo-resonator.

The irradiated echo pulses are received as echo signals, when such are reflected from obstacles, and fed through a line 22 to an amplifier 23. The amplified echo signals then pass through a line 24 into a switch 25. This switch is opened and closed by a pulse 26, which pulse appears at an exact time after emission of the ultrasonic pulse, said time corresponding to the transit time of the ultrasonic pulse over the pre-adjusted release range or distance. The pulse 26 thus forms a time window, through which the echo signal must pass exactly if it is to cause release.

The pulse 26 is derived from the 80 Hz pulses 27 on the output side of the frequency divider 18. These pulses 27 pass into an adjustable timing member 28 and also into an adjustable timing member 29. The timing member 28 determines the leading edge of the pulse 26, while the member 29 determines the trailing edge of the pulse 26. The outputs of the timing members 28 and 29 are connected in the manner represented to NAND gates 30, 31, 32 and 33, which cause the formation of the pulse 26.

If, during the presence of the pulse 26 at the switch 25, an echo pulse passes through the line 24 to the switch 25, that echo pulse 34 appears via an impedance transducer 35 and a line 36 at the inputs of two timing members 37 and 38. The timing member 37 forms a switching pulse 39 of sufficient duration from the echo signal 34, and this pulse, via an amplifier 40, is fed to an electromagnet 41 for the opening of the camera shutter.

The echo pulse 34 is delayed in the timing member 38, corresponding to the required exposure time, and is then converted in a timing member 42 into a switching pulse 43 which, after being amplified in an amplifier 44, is fed to an electromagnet for closing the shutter of the camera.

It will be understood that the embodiment of the present invention which has been described is merely illustrative of one of the applications of the principles of the invention. Numerous modifications may be made by those skilled in the art without departing from the true spirit and scope of the invention.

What is claimed is:

1. An underwater camera including a pressure tight housing having a camera therein and a release mechanism for releasing the camera shutter at a predetermined distance from the sea bed, the improvement in said release mechanism comprising:

electro-acoustic transducer means on the exterior of said housing for transmitting an ultrasonic signal and receiving an echo signal, and electronic circuit means on the interior of said housing and communicating directly through said housing with said transducer means to generate said ultrasonic signal for transmission by said transducer and to automatically release said shutter in response to the echo signal received by said transducer when said predetermined distance is reached.

2. The underwater camera of claim 1 wherein said transducer is located in a recess in the exterior of said housing.

3. The underwater camera of claim 2 including a cover for closing said housing, said recess being positioned in said cover.

4. The underwater camera of claim 3 wherein said recess comprises a radial bore in said cover, said cover being substantially circular in shape.

5. The underwater camera of claim 1 wherein said electronic circuit means includes means for producing periodically recurring pulses triggering first switch means for transmitting said ultrasonic signal to said transducer, timing means, means for releasing the camera shutter, and second switch means actuated by the timing means at the end of a predetermined period of time set on said timing means to transmit the echo signal received by said transducer to said means for releasing the camera shutter.

6. The underwater camera of claim 5 wherein said timing means includes first and second timing means, wherein said periodically recurring pulses also simultaneously trigger said second timing means, and switch means actuated after triggering of said second timing means after a predetermined period of time set on said second timing means to interrupt the echo signal received by said transducer to said means for releasing the camera shutter.

7. The underwater camera of claim 6 wherein said first and second timing means are adjustable.

8. The underwater camera of claim 7 wherein said first and second timing means are adjustable such that the time difference between said predetermined periods of time on said both said timing means remains constant.

9. The underwater camera of claim 5 including additional timing means, wherein said means for releasing the camera shutter comprises electromagnet means said echo signal actuating said electromagnet means and simultaneously triggering said additional timing means, said electromagnet means closing said shutter in response to the lapse, after triggering of said additional timing means, of a predetermined period of time set on said additional timing means.

10. The underwater camera of claim 9 wherein said additional timing means is adjustable such that the length of time that said shutter is open may be varied.

* * * * *